United States Patent
Nguyen et al.

(10) Patent No.: US 11,420,992 B2
(45) Date of Patent: Aug. 23, 2022

(54) METHODS OF RECOVERING LIGNIN AND OTHER PRODUCTS FROM BIOMASS

(71) Applicant: Battelle Energy Alliance, LLC, Idaho Falls, ID (US)

(72) Inventors: Quang A. Nguyen, Idaho Falls, ID (US); Lynn M. Wendt, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 16/947,054

(22) Filed: Jul. 16, 2020

(65) Prior Publication Data

US 2021/0017210 A1 Jan. 21, 2021

Related U.S. Application Data

(60) Provisional application No. 62/875,890, filed on Jul. 18, 2019.

(51) Int. Cl.
*C07G 1/00* (2011.01)
(52) U.S. Cl.
CPC ...................................... *C07G 1/00* (2013.01)
(58) Field of Classification Search
CPC ......... D21C 11/0007; D21C 1/04; D21C 1/06
See application file for complete search history.

(56) References Cited

U.S. PATENT DOCUMENTS

| 4,338,158 A | 7/1982 | Bentvelzen |
| 5,865,898 A | 2/1999 | Holtzapple et al. |
| 6,423,145 B1 * | 7/2002 | Nguyen ............... C12P 7/08 106/164.5 |
| 9,090,915 B2 | 7/2015 | Wang et al. |
| 10,421,667 B2 | 9/2019 | Foody et al. |
| 10,655,149 B2 | 5/2020 | Dechman et al. |
| 2012/0111321 A1 * | 5/2012 | Nguyen ............... C13K 1/02 127/1 |

(Continued)

FOREIGN PATENT DOCUMENTS

| WO | 2004/041995 A1 | 5/2004 | |
| WO | 2006/032282 A1 | 3/2006 | |
| WO | WO-2012121659 A1 * | 9/2012 | ............... C07C 1/22 |

OTHER PUBLICATIONS

PubChem (Sodium carbonate, https://pubchem.ncbi.nlm.nih.gov/compound/Sodium-carbonate, 2021) (Year: 2021).*

(Continued)

*Primary Examiner* — Liam J Heincer
(74) *Attorney, Agent, or Firm* — TraskBritt

(57) ABSTRACT

Methods of recovering lignin products and other products from biomass. The method comprises adding a chemical agent to a stored biomass comprising lignin to form a chemically-treated biomass. The chemical agent comprises an acid, a base, an inorganic salt, or a combination of the inorganic salt and one of the acid or the base. The chemically-treated biomass is stored under anaerobic conditions. Lignin products, such as high molecular weight lignin, medium molecular weight lignin, or low molecular weight lignin, are recovered from the chemically-treated biomass. Additional methods of recovering lignin products and other products from biomass are disclosed.

18 Claims, 5 Drawing Sheets

(56) References Cited

U.S. PATENT DOCUMENTS

| | | | | |
|---|---|---|---|---|
| 2012/0291774 | A1* | 11/2012 | Kilambi | C13K 13/002 127/44 |
| 2014/0083918 | A1* | 3/2014 | Nguyen | D21C 3/04 210/150 |
| 2014/0087432 | A1* | 3/2014 | Nguyen | D21C 11/0007 435/99 |
| 2014/0187759 | A1* | 7/2014 | O'Connor | C12P 7/10 530/500 |
| 2014/0315258 | A1* | 10/2014 | Nguyen | C12P 19/14 435/99 |
| 2016/0312259 | A1* | 10/2016 | Vainio | C12P 19/02 |
| 2018/0029896 | A1* | 2/2018 | Foody | C12P 7/16 |
| 2018/0142177 | A1* | 5/2018 | Dahlstrand | C07G 1/00 |

OTHER PUBLICATIONS

Wang et al. (Separation and Purification Technology 105 (2013) 98-105) (Year: 2013).*
Zhu et al., Bioresource Technology 100, 2009, 2411-2418 (Year: 2009).*
Borregaard, Animal Feed Additives, Bacterial Inhibition Properties, https://lignotechfeed.com/SoftAcid/Bacterial-Inhibition-Properties, retrieved Aug. 25, 2020, 2 pages.
Borregaard, Animal Feed Additives, Feeding Trials, https://lignotechfeed.com/SoftAcid/Feeding-Trials, retrieved Aug. 25, 2020, 3 pages.
Borregaard, Animal Feed Additives, Laboratory Trials, https://lignotechfeed.com/SoftAcid/Laboratory-Trials, retrieved Aug. 25, 2020, 2 pages.
Borregaard, Animal Feed Additives, Mechanism, https://lignotechfeed.com/SoftAcid/Mechanism, retrieved Aug. 25, 2020, 2 pages.
Borregaard, Animal Feed Additives, Softacid, https://lignotechfeed.com/SoftAcid, retrieved Aug. 25, 2020, 3 pages.
Borregaard, Animal Feed Additives, Technological Benefits, https://lignotechfeed.com/SoftAcid/Technological-Benefits, retrieved Aug. 25, 2020, 3 pages.
Borregaard, The Way Forward With Organics, https://response.lignotechfeed.com/the-way-forward-with-organic-aids-download, retrieved Aug. 25, 2020, 3 pages.
Chen et al., "A Highly Efficient Dilute Alkali Deacetylation and Mechanical (disc) Refining Process for the Conversion of Renewable Biomass to Lower Cost Sugars", Biotechnology for Biofuels 2014, Jul. 1998, 12 pages.
Dong et al., "Antimicrobial and Antioxidant Activities of Lignin from Residue of Corn Stover to Ethanol Production", Elsevier B.V. 2011, Industrial Crops and Products vol. 34 (2011) pp. 1629-1634.
Ghasemzadeh et al., "Comparison of Pretreatment Methods for Biofuel Production", International Conference on Agriculture, Food and Environmental Engineering (ICAFFF 2014), Jan. 15-16, 2014, 3 pages.
Liu et al., "Corn Stover Pretreatment by Inorganic Salts and Its Effects on Hemicellulose and Cellulose Degradation", Bioresource Technology 100 (2009) 5865-5871, 7 pages.
Maddox et al., "Antibacterial Activity of Phenolic Compounds Against the Phytopathogen Xylella fastidiosa", Curr Microbiol (2010) vol. 60 pp. 53-58.
National Renewable Energy Laboratory, "NREL Overcomes Obstacles in Lignin Valorization", Jan. 2015, 1 page.
Sierra et al., "Long-term Lime Pretreatment of Poplar Wood", AIChE Journal, May 2011, vol. 57, No. 5, 9 pages.

* cited by examiner

METHODS OF RECOVERING LIGNIN AND OTHER PRODUCTS FROM BIOMASS

CROSS-REFERENCE TO RELATED APPLICATION

This application claims the benefit under 35 U.S.C. § 119(e) of U.S. Provisional Patent Application Ser. No. 62/875,890, filed Jul. 18, 2019, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods of recovering lignin products and other products from biomass.

BACKGROUND

Long-term storage of baled agricultural residue (e.g., corn stover, wheat straw) leads to greater than 10% dry matter loss as a result of microbial degradation. Ensiled storage of biomass reduces dry matter loss to about 6%. Degraded bales also generate excessive amount of fines during grinding and milling operation. Fines, co-mingled with large biomass particles, can cause inoperability for equipment used to process the biomass. Conventional cellulosic biomass ethanol conversion technologies generally comprise the following major process acts: feedstock preprocessing to convert raw biomass into feedstock, pretreatment (including steam explosion, dilute acid, or alkali), enzymatic hydrolysis and fermentation to produce ethanol, ethanol recovery via distillation, and dewatering stillage into a lignin residual cake for use as a biomass boiler fuel. Ethanol and lignin are, therefore, recovered from the biomass. In many processes, the lignin residue is combusted to produce process steam, which is used to generate electricity. The lignin residue contains a substantial amount of moisture and has a high ash content, so its heat value is low.

Lignin conversion to bioproduct (e.g., nylon) is essential for achieving $3/gasoline gallon equivalent (GGE) for biochemical conversion pathway. Lignin is an organic polymer, such as a cross-linked phenolic polymer, that is present in vascular plants and algae. Conventional pretreatment technologies for lignin conversion, such as dilute acid hydrolysis, generally result in a condensed lignin residue that comingles with many impurities, such as undigested carbohydrate, protein (yeast and enzyme) and ash (soluble and insoluble). Converting the lignin from enzyme hydrolysate residue requires expensive separation and purification acts, resulting in high capital and operating costs. Since it is time consuming and expensive to produce high-value products from lignin, low operational reliability and product yield are major barriers to conventional methods of recovering lignin, and to commercialization of biofuel and bioproducts.

A deacetylation process to reduce the inhibitory effect of acetate on enzyme hydrolysis and fermentation has been developed. This process also generates a clean, caustic-soluble lignin fraction that can be converted to chemicals (e.g., nylon, bioplastic). The lignin is extracted along with the deacetylation process. However, there are several drawbacks associated with the process: the use of sodium hydroxide also dissolves a significant amount of xylan, which complicates lignin recovery. Furthermore, the process is water intensive, with reported solids contents of 8 wt %, which leads to high capital and operating costs.

BRIEF SUMMARY

A method according to some embodiments of recovering lignin products and other products from biomass is disclosed. The method comprises adding a chemical agent to a stored biomass comprising lignin to form a chemically-treated biomass. The chemical agent comprises an acid, a base, an inorganic salt, or a combination of the inorganic salt and one of the acid or the base. The chemically-treated biomass is stored under anaerobic conditions. Lignin products are recovered from the chemically-treated biomass.

A method according to other embodiments of recovering lignin products and other products from biomass is disclosed. The method comprises storing a chemically-treated biomass at a moisture content of between about 30% and about 50%. The chemically-treated biomass comprises lignin and an acid, a base, an inorganic salt, or a combination of the inorganic salt and one of the acid or the base. The chemically-treated biomass is heated during storage and lignin products are recovered.

A method according to additional embodiments of recovering lignin products and other products from biomass is disclosed. The method comprises adding a chemical agent to a biomass comprising lignin to form a chemically-treated biomass. The chemical agent comprises an acid, a base, an inorganic salt, or a combination of the inorganic salt and one of the acid or the base. The chemically-treated biomass is exposed to steam to form a liquid stream. The liquid stream is separated from a solid portion of the chemically-treated biomass and lignin products are recovered from the liquid stream.

DETAILED DESCRIPTION

Figure 1:
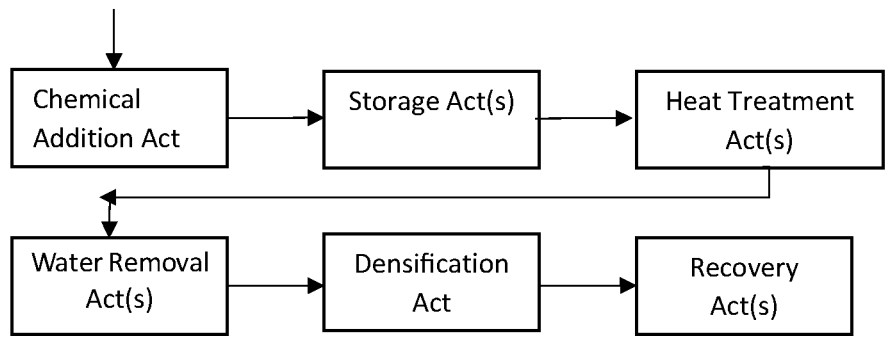
FIGS. 1-5 are flow charts showing process acts for processing and recovering lignin products and other products from biomass in accordance with embodiments of the disclosure.

Methods of recovering products, such as lignin products, from biomass are disclosed. In addition to the lignin products, other components (e.g., other products) of the biomass are recovered. The biomass is delignified during storage and following addition of a chemical agent. The chemical addition occurs before the storage of the biomass, while the delignification of the biomass occurs during the storage of the biomass. Process acts to recover the lignin products and the other products include a chemical addition act, a storage act, a heat treatment act, a water removal act, a densification act, and a recovery act. Each of the process acts may be conducted one or more times during the process. One or more optional process acts may be conducted before the chemical addition act or after the chemical addition act.

Each of the optional process acts may be conducted one or more times during the process. The recovered products may be configured as one or more of an oil, a slurry, a syrup, a powder, or pellets. Water-soluble lignin products are recovered from a liquid stream produced from the biomass and water-insoluble lignin products and/or other products are recovered from a solid portion (e.g., a fiber material) of the biomass. During the process acts, the water-soluble lignin products of the biomass become soluble in the liquid stream while the water-insoluble products (water-insoluble lignin products, other water-insoluble products) are present in the solid material. The liquid stream may be concentrated to form a syrup or slurry containing the water-soluble lignin products or the lignin products may be separated into the water-soluble lignin products and the water-insoluble lignin products. The recovered products may exhibit one or more of antioxidant properties or anti-microbial properties.

The methods of recovering the lignin products and other products according to embodiments of the disclosure achieve a higher yield of the lignin products from a given amount of biomass compared to conventional methods of recovering lignin from biomass, such as by deacetylation technology, ammonia treatment, or lime treatment. The lignin products recovered according to embodiments of the disclosure are also produced at a higher purity than the lignin recovered using conventional methods of delignification. The lignin products are recovered from the biomass at an earlier processing stage than is attainable using conventional methods of delignifying the biomass. The methods according to embodiments of the disclosure also minimize microbial degradation during long-term storage of the biomass and enable conversion of the biomass into highly digestible products, which may be stored for longer periods of time compared to conventional methods of recovering lignin. The lignin products and other products may be recovered from the biomass at lower capital investment and improved operability compared to conventional methods of recovering the lignin. The recovery of the other products in addition to the lignin products also enables full utilization of the biomass to produce high value products with minimal waste. In addition, waste streams from the process are reduced (e.g., minimized) compared to conventional methods of recovering lignin from biomass. Since multiple products are recovered, the methods according to embodiments of the disclosure are more cost effective in recovering high value products from biomass than conventional methods of recovering lignin from biomass. In addition, water and other reagents (e.g., chemical agents) may be recovered and reused (e.g., recycled), such as in subsequently-conducted process acts or in process acts of other processes.

The lignin products recovered from the biomass may include a high molecular weight lignin, a medium molecular weight lignin, and a low molecular weight lignin. The high molecular weight lignin, the medium molecular weight lignin, and the low molecular weight lignin are referred to collectively herein as lignin products. The molecular weight of the lignin product depends on a degree of polymerization (DP) that occurs during the process acts conducted on the biomass, such as during one or more of the chemical addition act, the storage act, or the heat treatment act. As known in the art, lignin is a polymer of phenylpropane monomeric units, such as 4-hydroxy-3-methoxyphenyipropane 35-dimethoxy-4-hydroxyphenyipropane and/or 4-hydroxyphenylpropane. Lignin is a heterogeneous material that includes a degree of polymerization and does not have a specific chemical structure or a specific molecular weight. The lignin products include methoxy groups of the phenylpropane monomeric units reacted with one another, with the chemical structure of the lignin products similar to the chemical structure of the monomeric units, except that the monomeric units are polymerized. For the high molecular weight lignin, the medium molecular weight lignin, and the low molecular weight lignin, multiple chemical compounds including the monomeric units above are present, with the chemical structure of the resulting polymer being similar to the chemical structure of the monomeric units. As used herein, the terms "high molecular weight," "medium molecular weight," and "low molecular weight" are relative terms and do not correspond to specific molecular weights or specific molecular weight ranges of the chemical compounds. Instead, the terms "high molecular weight," "medium molecular weight," and "low molecular weight" correspond to the extent of the DP and thus relative solubilities in a medium (e.g., water, a dilute solution of sodium hydroxide) of the respective lignin products at the same temperature conditions and the same concentration. Each of the high molecular weight lignin and the medium molecular weight lignin is insoluble in water at about neutral pH, and the low molecular weight lignin is soluble in water at about neutral pH. The medium molecular weight lignin includes polymers of the monomeric units having greater than or equal to about ten DP (e.g., greater than or equal to about ten phenylpropane rings) and less than about forty-five DP, and the low molecular weight lignin includes monomeric, dimeric, and/or trimeric forms of the monomeric units (e.g., from about one DP to about three DP). The high molecular weight lignin includes greater than or equal to about fifty DP (e.g., greater than or equal to about fifty phenylpropane rings).

As used herein, the singular forms "a," "an," and "the" are intended to include the plural forms as well, unless the context clearly indicates otherwise.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should, or must be, excluded.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

Figure 2:
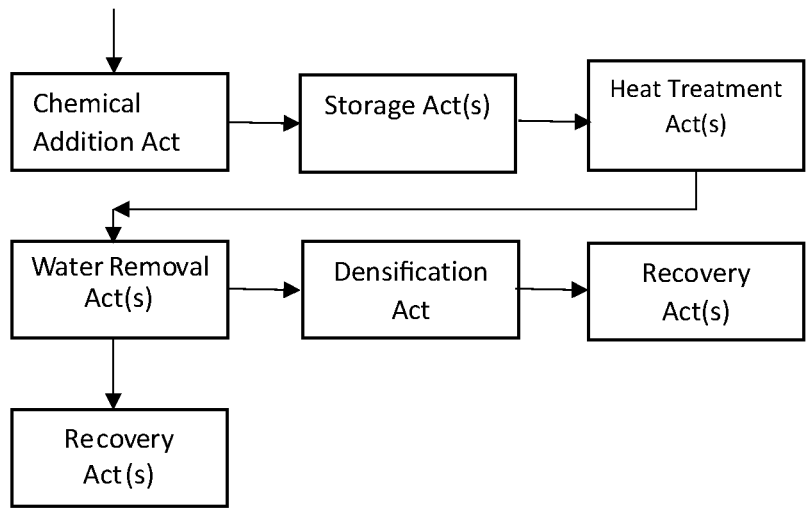
Figure 3:
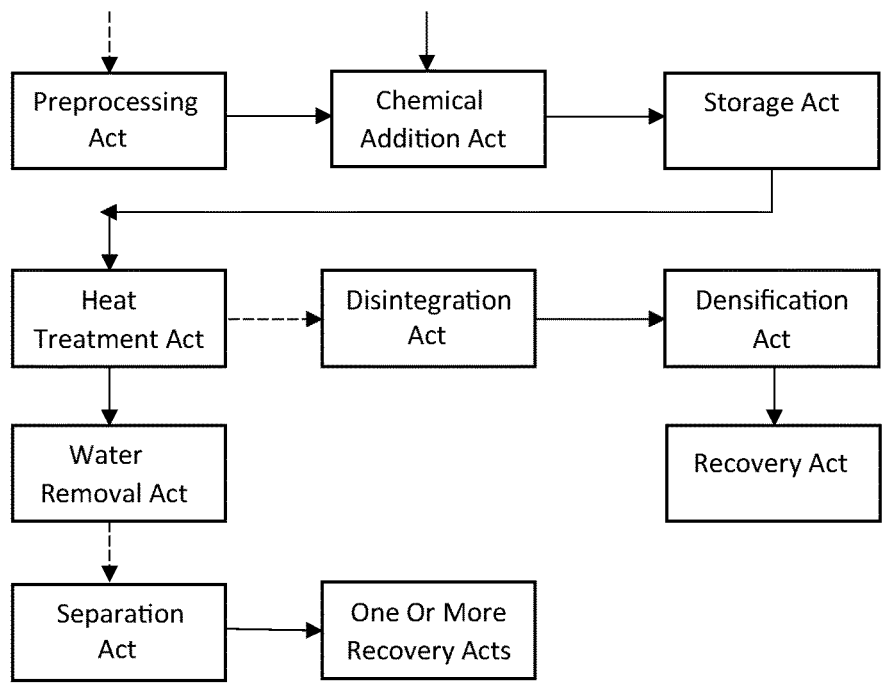
Figure 4:
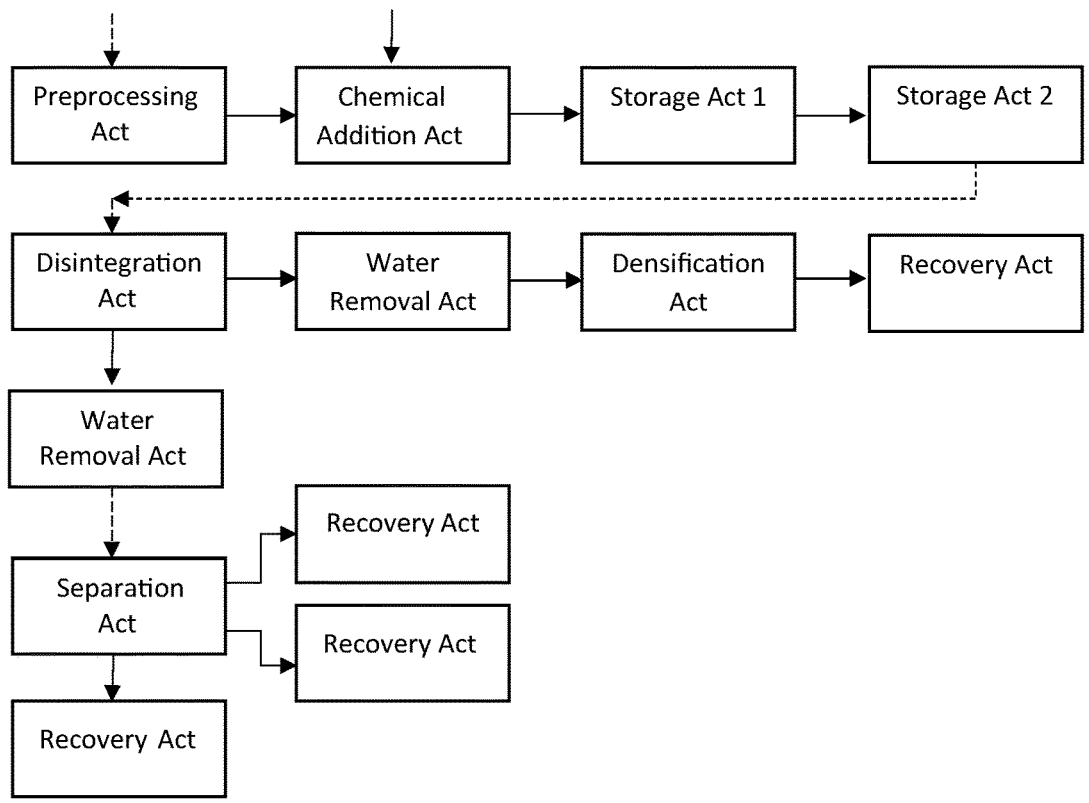
Figure 5:
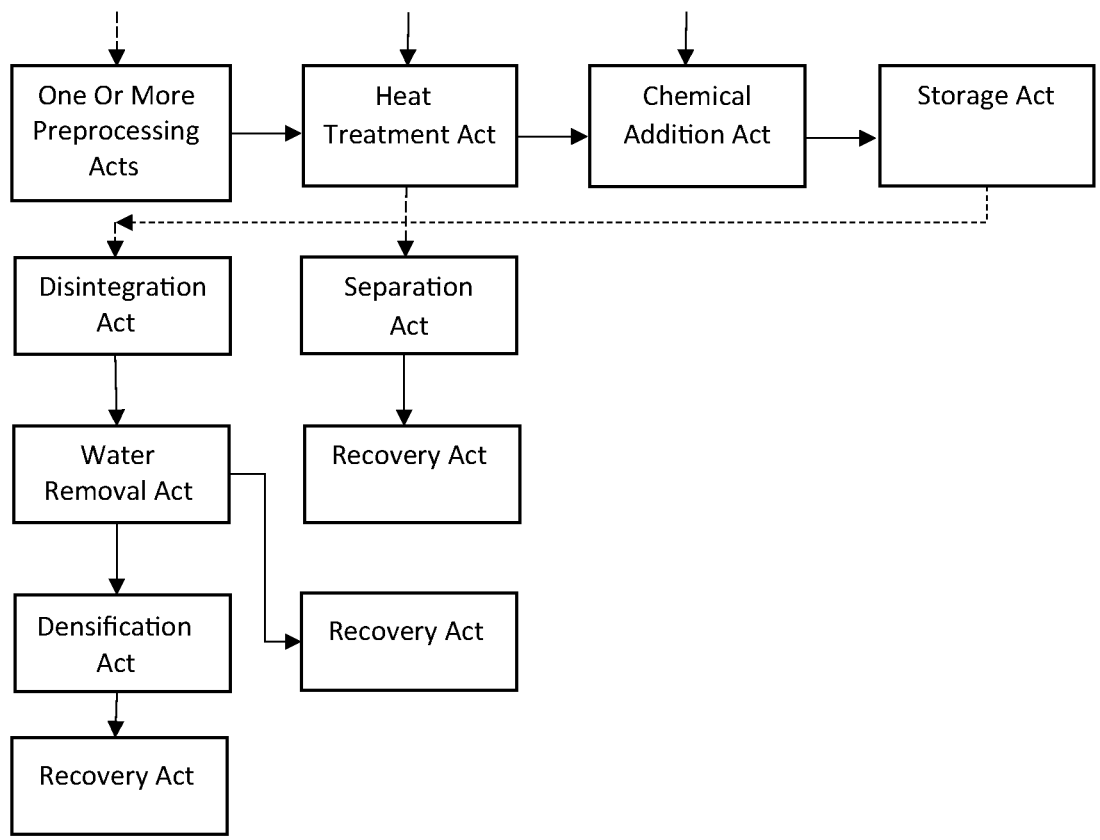

To recover lignin and the other products from the biomass, one or more process acts is conducted on the biomass, as shown in FIGS. 1-5. The process acts include a chemical addition act, a storage act, a heat treatment act, a water removal act, a densification act, and a recovery act. Each of the acts may be conducted one or more times, depending on the chemical composition of the biomass and the desired product(s) to be recovered. By way of example only, multiple water removal acts, as shown in FIG. 4, may be conducted or multiple recovery acts, as shown in FIGS. 2, 4, and 5, may be conducted. One or more lignin products (e.g., a syrup, a powder) and pellets may, for example, be recovered from the processes illustrated in FIGS. 1 and 2. While the process acts are described as exhibiting a single function, each of the process acts may provide more than one function. For instance, the water removal act may also provide separation of the products. In addition, the process acts may occur sequentially or substantially simultaneously. By way of example only, the heat treatment act may occur substantially simultaneously with the storage act or may be conducted after the storage act. The chemical addition act (e.g., a chemical impregnation act) occurs before storage of the biomass while the delignification of the biomass occurs during the storage of the biomass and following the chemical addition. The delignified biomass is easily digestible following exposure to cellulase enzymes. By incorporating the chemical addition act and the heat treatment act into the storage of the biomass, the complexity and energy intensive acts of the process are simplified. While FIGS. 1 and 2 show specific process acts conducted in a specific sequence, the process acts may be conducted in different sequences depending on the chemical composition of the biomass and the desired product(s). The process acts may be conducted in conventional equipment.

Additional process acts may, optionally, be conducted in combination with the process acts described above depending on the chemical composition of the biomass and the desired product(s) to be recovered. The additional process acts include one or more of a preprocessing act, a disintegration act (e.g., a deconstruction act), a washing act, and a separation act, as shown in FIGS. 3, 4, and 5. The optional process acts are indicated in FIGS. 3, 4, and 5 with dashed lines. As with FIGS. 1 and 2, the chemical addition act occurs before the storage of the biomass while the delignification of the biomass occurs during the storage of the biomass and following the chemical addition. One or more of the optional preprocessing acts may be conducted before the chemical addition act, such as conducting one or more size reduction acts before the chemical addition act. The one or more optional disintegration act, the washing act, and the separation act may be conducted after the chemical addition act. One or more of an oil, a slurry, a syrup, a powder, and pellets may, for example, be recovered from the processes illustrated in FIGS. 3, 4, and 5. While FIGS. 3, 4, and 5 show specific process acts conducted in a specific sequence, the process acts may be conducted in different sequences depending on the chemical composition of the biomass and the desired product(s). The optional process acts may be conducted in conventional equipment.

While not illustrated in FIGS. 1-5, the water obtained following the disintegration act 55 and the densification act 62 may be converted to steam and reused in the heat treatment 40, in a washing act, or as water utilized during other process acts. The chemical agent 25 (the acid, base, or inorganic salt) may also be recovered from the liquid stream 45 and reused in subsequent process acts.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system.

In addition to the lignin products (e.g., the high molecular weight lignin, the low molecular weight lignin, the very high molecular weight lignin), other products may be recovered from the biomass including, but not limited to, carbohydrates, oils (e.g., essential oils), etc. Since the high molecular weight lignin product, the medium molecular weight lignin product, and the low molecular weight lignin product have different solubilities in water, the water-soluble and water-insoluble forms of the lignin may be separated based on their water solubilities. The recovered lignin products and other products may be configured as one or more of a syrup (e.g., a slurry), an oil, a powder, or pellets. Depending on process configurations, the products may include, but are not limited to, a syrup that contains water-soluble lignin and has anti-microbial properties, a water-insoluble lignin that has anti-microbial properties, or a digestible cellulose-rich material.

The biomass may be a herbaceous biomass or a woody biomass that contains lignin, carbohydrates, one or more complexes of lignin and a carbohydrate, and other components. By way of example only, the biomass may be agricultural residues such as corn stover, wheat straw, barley straw; herbaceous energy crops such as energy sorghum, switchgrass, miscanthus, or *Arundo donax*; woody energy crops such as poplar or willow; or woody residues such as forest thinnings. The biomass may be a hard wood or a soft wood. The chemical composition of the biomass may vary depending on the biomass that is used. The biomass may be used either in bale format (bale logistics) or chopped format (e.g., single-pass harvest and chop logistics). In some embodiments, the biomass is provided as bales.

The chemical addition act (e.g., a chemical impregnation act) is conducted on the biomass by adding the chemical agent to a vessel that contains the biomass. As described in more detail below, the chemical agent may be an acid, a base (e.g., alkali, caustic), an inorganic salt, the inorganic salt in combination with the acid, or the inorganic salt in combination with the base. The biomass is contained in a conventional vessel in which one or more of the process acts may be conducted. By way of example only, the chemical addition act and the storage act may be conducted in the vessel. The chemical agent may be added in solution, such as in a liquid solution, to produce a liquid stream containing the chemically-treated biomass. The chemical agent may also be combined with the biomass during a baling act (such as by adding bacteria inoculum or the acid, base, or inorganic salt to the biomass bales prior to ensiling) or to chopped biomass during a single-pass harvest and bale size reduction act.

The biomass is exposed to the chemical agent for a sufficient amount of time for the chemical agent to become substantially uniformly dispersed in the biomass. In other words, the chemical agent may substantially impregnate the biomass. The chemical agent may disperse throughout the biomass without mixing. The chemical agent may be added directly to the biomass, as shown in FIGS. 1 and 2, or the biomass may be subjected to optional preprocessing acts before adding the chemical agent, as shown in FIGS. 3, 4, and 5. In addition to preserving the biomass during the storage act, the chemical agent may change the solubility of the lignin in the liquid stream, such as in water, enabling the water-soluble lignin and other water-soluble products to be separated from other components of the biomass, such as the water-insoluble lignin and other water-insoluble products. The addition of the chemical agent may enable up to about 50% by volume of the lignin to be dissolved in the liquid stream. The low molecular weight lignin product is relatively soluble in water of the liquid stream while the medium molecular weight lignin product and the high molecular weight lignin product are relatively insoluble in water. In addition, carbohydrates in the biomass are substantially soluble in the liquid stream. The biomass is referred to herein as chemically-treated biomass following the addition of the chemical agent. The chemically-treated biomass also includes a complex of lignin and carbohydrates, which is decomposed by the chemical agent. The chemically-treated biomass may also be subjected to other process acts before the addition of the chemical agent, as shown in FIGS. 3, 4, and 5. For instance, preprocessing act(s) may be conducted on the biomass before the chemical addition to form the chemically-treated biomass. The biomass is referred to herein as "preprocessed biomass" if the biomass has only been subjected to preprocessing acts. The term "chemically-treated biomass" is used herein to refer to biomass that has been chemically treated or to biomass that has been both preprocessed and chemically treated. A desired pH of the preprocessed biomass 20 may be achieved before the preprocessed biomass 20 enters storage.

The storage act is conducted on the chemically-treated biomass. The chemically-treated biomass may be stored in the vessel for an amount of time sufficient for the water solubility of the lignin products to change. During storage, chemical properties (e.g., biological activity) in the chemically-treated biomass may be maintained (e.g., preserved) such that the chemical properties of the biomass are not substantially affected by the temperature and/or time conditions of the storage conditions. Depending on the chemical composition of the biomass and the desired product(s) to be recovered, the chemically-treated biomass may be stored for a short duration, such as from about six hours to less than about two days. Alternatively, the chemically-treated biomass may be stored for a long duration, such as from greater than about three days to about nine months, from about one week to about nine months, from about two weeks to about nine months, from about three weeks to about nine months, from about one month to about nine months, from about two months to about nine months, from about three months to about nine months, from about four months to about nine months, from about five months to about nine months, from about six months to about nine months, from about seven months to about nine months, or from about eight months to about nine months. In some embodiments, the chemically-treated biomass is stored for a short term, such as from about six hours to less than about two days. In other embodiments, the chemically-treated biomass is stored for a long term, such as from greater than about three days to about nine months. In yet other embodiments, the chemically-treated biomass is stored long term following the chemical addition and is then is subjected to the heat treatment act during short term storage. The short term storage or the long term storage may be selected depending on the length of time between harvesting the biomass and using (e.g., processing) the biomass.

During storage, the heat treatment act is conducted on the chemically-treated biomass to increase a moisture content of the chemically-treated biomass. The heat treatment act may include exposing the chemically-treated biomass to water (e.g., steam) or other heat source to increase the moisture content. The heat treatment may, for example, be conducted in the vessel. Exposing the chemically-treated biomass to water may also extract one or more desired product(s) from the biomass, such as by a liquid:liquid extraction of the desired product. The chemically-treated biomass may be exposed to the heat treatment during storage of the chemically-treated biomass. The heat treatment may be conducted at the beginning of the storage act or may begin after the chemically-treated biomass has been stored for a portion of the storage time. In addition to increasing the moisture content, the heat treatment may improve the delignification of the biomass by increasing the temperature to which the chemically-treated biomass is exposed, which increases the solubility of the water-soluble components. Water from the heat treatment also contributes to the liquid stream (e.g., a liquid portion) in which one or more of the product(s) are contained. As described below, other products may be present in the solid portion of the chemically-treated biomass, such as in the fiber material. The heat treatment may be conducted using conventional equipment.

A water removal act is conducted on the liquid stream to increase a concentration of the desired product(s) in the liquid stream, to separate water-soluble products in the liquid stream from water-insoluble product(s), or to separate the liquid stream from the solid portion of the chemically-treated biomass. The water removal act may include, but is not limited to, one or more of a liquid:liquid separation, a solid:liquid separation, filtration, compaction, or evaporation. The water may be removed by, for example, filtration or evaporation. For instance, the chemically-treated biomass may be exposed to a low temperature drying act that removes (e.g., evaporates) at least a portion of the water of the liquid stream. The low temperature drying may substantially remove the water or may remove only a portion of the water. Alternatively, the chemically-treated biomass may be subjected to a filtration act to separate the water-soluble and water-insoluble products or to separate the solid portion from the liquid portion. The filtration may include, but is not limited to, pressure filtration, vacuum filtration, membrane filtration, microfiltration, nanofiltration, or ultrafiltration. The water obtained following the water removal may be reused in an optional washing act or as water during other process acts, or may be converted to steam and re-used in the heat treatment. The water removal may be conducted using conventional equipment.

The densification act may be conducted on the solid portion of the chemically-treated biomass to form a solid product, such as a high fiber product, which is separated from the liquid stream. After removing water, the solid product may, for example, be configured as pellets containing one or more of the desired products. The densification act may include a pelleting act, in which the solid product is formed into pellets by further densification. The pellets may, for example, contain highly polymerized lignin (e.g., the high molecular weight lignin product) and exhibit a moisture content of less than or equal to about 10%, such as between about 1% and about 10%, between about 2% and about 10%, between about 4% and about 10%, between about 4% and about 8%, or between about 4% and less than about 6%. In some embodiments, the moisture content of the pellets is about 10%. In other embodiments, the moisture content of the pellets is about 5%. The water obtained following the densification may be reused in a washing act or as water during other process acts, or may be converted to steam and reused in the heat treatment. The densification may be conducted in conventional equipment.

One or more recovery acts may be conducted at various portions of the process depending on the desired product(s) to be recovered. The recovery act may be conducted on the liquid stream after the densification act, as shown in FIG. 1, after the water removal act, as shown in FIG. 2, after each of the water removal act and the densification act, as shown in FIG. 2, after each of the densification act and the separation act, as shown in FIGS. 3 and 4, or after each of the densification act, the separation act, and the water removal act, as shown in FIG. 5. The product(s) may be recovered from the liquid stream as a syrup, oil, slurry, or powder. The product(s) may be recovered from the liquid stream by, for example, liquid:liquid separation, solid:liquid separation, filtration, precipitation, evaporation, distillation, or other technique. The filtration may include, but is not limited to, membrane filtration, microfiltration, nanofiltration, or ultrafiltration. The water obtained following the recovery may be reused in a washing act or as water during other process acts, or may be converted to steam and re-used in the heat treatment. The product recovery may be conducted in conventional equipment.

The additional process acts may, optionally, be conducted on the biomass depending on the chemical composition of the biomass and the desired product(s) to be recovered. The additional process acts include one or more of the preprocessing act, the disintegration act, the washing act, and the separation act. The preprocessing act may be conducted on the biomass, while the disintegration act, the washing act, and/or the separation act may be conducted on the chemically-treated biomass. The optional process acts are indicated in FIGS. 3 and 4 with dashed lines. In the processes according to embodiments of the disclosure in FIGS. 3, 4, and 5 illustrate, some process acts are indicated as being conducted multiple times, such as multiple storage acts, multiple recovery acts, or multiple water removal acts. One or more of the process acts and the optional process acts may be conducted depending on the chemical composition of the biomass and the desired product(s). By way of example only, a lignin powder containing medium molecular weight lignin, a lignin slurry containing low molecular weight lignin, pellets containing high molecular weight lignin, the chemical agent, and/or water may be recovered from the processes illustrated in FIGS. 3-5.

The optional preprocessing of the biomass may include, but is not limited to, a size reduction act to separate portions of the biomass based on size. The preprocessing act may, for example, remove small materials and/or large materials from the biomass. The small materials and/or large materials may be substantially removed before the remainder of the biomass is subjected to the chemical addition act. The small materials and large materials may include one or more of fines and contaminants, such as dirt, rocks, gravel, sand, metal, other fine materials, or other coarse materials. The size reduction act may be an air classification act, a washing act, a milling act, or a mechanical screening act. The air classification act may be conducted to separate the biomass into a light fraction and a heavy fraction. The light fraction may include, for example, bark, needles, and twigs, which may have a higher ash content than the heavy fraction. The heavy fraction may include, for example, wood and may have a lower ash content than that of the light fraction. An air density separator may be used to produce the light fraction and the heavy fraction, which include smaller materials and larger materials, respectively.

The size reduction act may be conducted on the biomass before conducting the air classification act or after conducting the air classification act. Alternatively, only the size reduction act may be conducted. If the size reduction act is conducted before the air classification act, the fines and the contaminants may be removed from the biomass, followed by separating the biomass into the light fraction and the heavy fraction. If the size reduction act is conducted after the air classification act, the fines and the contaminants may be removed from each of the light fraction and the heavy fraction. In some embodiments, the biomass is subjected to the size reduction act, followed by conducting the air classification act to form the light fraction and the heavy fraction. The air classification or mechanical screening may be conducted using conventional equipment.

The optional disintegration act may be conducted on the chemically-treated biomass to separate (e.g., fractionate) the solid portion of the chemically-treated biomass from the liquid stream. The disintegration act may further weaken the biomass, which has already been weakened following the chemical addition act. The disintegration act may include, but is not limited to, a mechanical disintegration act, such as a mechanical dewatering act in which the solid portion is separated from the liquid stream. For example, the mechanical disintegration may be conducted to separate the solid portion, which may subsequently be formed into pellets as discussed above, from the liquid stream. The mechanical dewatering may be conducted on the chemically-treated biomass to form the high fiber product that is further processed to form the pellets containing the high molecular weight lignin product. Water obtained following the mechanical disintegration may be converted to steam and used in, for example, a heat treatment or a steam distillation. Alternatively, the water may be recovered and used in other process acts. The disintegration of the chemically-treated biomass may be conducted in conventional equipment.

The optional separation act may be conducted on the chemically-treated biomass or on the liquid stream to remove additional products from one another. The separation act may, for example, include a liquid:liquid separation, a solid:liquid separation, filtration, distillation, or other technique. The separation may be conducted in conventional equipment. The liquid:liquid separation may, for example, separate the medium molecular weight lignin from the low molecular weight lignin based on their different solubilities in water. The solid:liquid separation may, for example, separate the high molecular weight lignin from the low and medium molecular weight lignins or separate the medium molecular weight lignin from the low molecular weight lignin following precipitation of one of the lignin products. By conducting the separation act, one or more products may be recovered from the biomass. By way of example only, a lignin product, a slurry product, and the chemical agent may be recovered. The recovered chemical agent may be recycled and reused in an additional chemical addition act or in a chemical addition act of another process. The water obtained following the separation may be reused in the washing act or as water during other process acts, or may be converted to steam and reused in the heat treatment.

The optional washing act may be conducted on the chemically-treated biomass before, for example, the disintegration act is conducted. The washing may improve the recovery of water-soluble products before conducting the disintegration act.

The products recovered from the biomass may include one or more oil, one or more slurry (e.g., one or more syrup), one or more powder, one or more pellets, or combinations thereof. The products recovered from the biomass may be used, for example, by biofuel producers, biochemical producers, wood pellet manufacturers, and agriculture, horticulture, or animal feed producers. The oil may, for example, be an essential oil that is recovered from the preprocessed biomass or from the chemically-treated biomass after a disintegration act is conducted. The syrup may include the low molecular weight lignin and may be used as a feed supplement (e.g., a nutrient slurry) having antioxidant properties or as a substrate for fermentation to fuels and chemicals or adhesive for biomass fuel pellets. Alternatively, the syrup may be used as a high value plant growth nutrient slurry containing the water-soluble components from the biomass or as an ingredient of hydro-mulch. The powder may include the medium molecular weight lignin. The pellets containing the high molecular weight lignin, which are produced following the densification, may be used as animal feed, water-resistant fuel for boilers, or as a substrate for enzymatic hydrolysis and fermentation to biofuels and chemicals.

While FIGS. 1-5 illustrate examples of process acts and optional processing acts conducted according to embodiments of the disclosure, the process acts and optional processing acts may be conducted in different sequences and the process acts or optional processing acts may be conducted one or more times, depending on the chemical composition of the biomass and the desired product(s).

Figure 6:
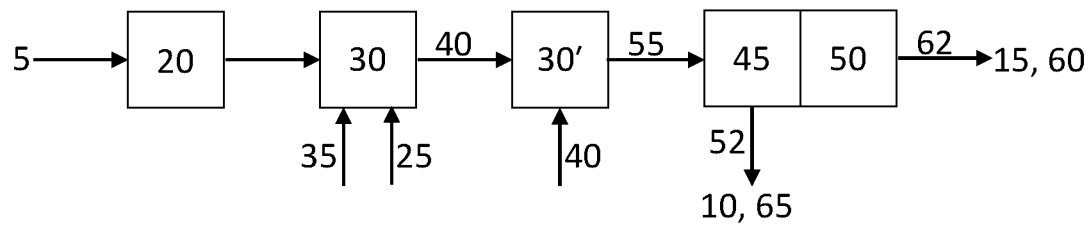
FIGS. 6-9 are process flow diagrams illustrating the processing of and recovery of lignin products and other products from biomass in accordance with embodiments of the disclosure.

FIGS. 6-9 illustrate examples of biomass processing to recover lignin products and other products from the biomass 5. As shown in FIG. 6, a syrup 10 is recovered from the biomass 5 and pellets 15 are produced from the biomass 5 according to embodiments of the disclosure. The biomass 5 may be milled and added to the vessel, forming preprocessed biomass 20. The vessel may be a storage container, such as a conventional storage bunker, silo, or pile. The chemical agent 25 is added to the preprocessed (e.g., milled) biomass 20 and stored under anaerobic conditions, producing chemically-treated biomass 30. A gas, such as carbon dioxide 35, may optionally be added to the chemically-treated biomass 30 to maintain the anaerobic conditions. The chemical agent 25 may be in solution, such as an aqueous solution, which is added to the preprocessed biomass 20. The solution may include the chemical agent 25 in aqueous solution, such as the acid, the base (e.g., alkali, caustic), the inorganic salt, the inorganic salt in combination with the acid, or the inorganic salt in combination with the base. However, a medium other than water may be used. The chemical agent 25 may also be referred to herein as a delignification agent (DLA). The acid may be a mineral acid, an organic acid, etc., including, but not limited to, one or more of sulfuric acid, formic acid, or acetic acid. The base may include, but is not limited to, one or more of sodium hydroxide, calcium hydroxide, potassium hydroxide, or magnesium hydroxide. The inorganic salt may include, but is not limited to, one or more of sodium carbonate, magnesium bisulfite, sodium bisulfite, calcium chloride ($CaCl_2$), magnesium chloride ($MgCl_2$), iron(II) chloride ($FeCl_2$), iron(II) sulfate ($FeSO_4$), iron(III) chloride ($FeCl_3$), or iron(III) sulfate ($Fe_2(SO_4)_3$). The chemical solution may be an acidic aqueous solution, a basic aqueous solution, or an inorganic salt aqueous solution. In some embodiments, the delignification agent includes dilute sulfuric acid and iron sulfate. In other embodiments, the delignification agent includes dilute sulfuric acid and $FeSO_4$. In yet other embodiments, the delignification agent includes magnesium bisulfite ($H_2MgO_6S_2$). In other embodiments, the delignification agent includes magnesium hydroxide, calcium hydroxide, or sodium hydroxide. In yet other embodiments, the delignification agent includes sulfuric acid.

The chemical agent 25 is added to the preprocessed (e.g., milled) biomass 20 to achieve a desired pH and a moisture content (MC) of between about 30% and about 50%, such as between about 40% and about 50%. The pH of the preprocessed biomass 20 may be adjusted to solubilize the lignin. If an acidic pH is desired, a sufficient amount of the solution containing the chemical agent 25 is added to the preprocessed biomass 20 to achieve the desired pH, such as adding a sufficient amount of an acidic solution to the preprocessed biomass to obtain a pH of from about 1.0 to about 6.5, such as from about 2.0 to about 4.0 or from about 2.5 to about 3.5. If a basic pH is desired, a sufficient amount of the solution is added to the preprocessed biomass 20 to achieve the desired pH, such as a pH of from about 8.0 to about 13.0, such as from about 11.0 to about 13.0 or from about 12.0 to about 13.0. A sufficient amount of an inorganic salt solution may be added to the preprocessed biomass 20 to solubilize the lignin products, such as from 0.01% to about 3% or from about 0.05% to about 1.5% of the dry mass of biomass. The preprocessed biomass 20 is referred to herein as chemically-treated biomass after adding the chemical agent 25 and includes lignin, complexes of lignin and a carbohydrate, etc.

After a sufficient amount of time, the chemical agent 25 may become impregnated in the preprocessed biomass 20, forming the chemically-treated biomass 30. The chemically-treated biomass 30 may be stored under the pH conditions or inorganic salt conditions for an amount of time sufficient to break down the lignin-carbohydrate complexes and to solubilize the lignin products (e.g., the low molecular weight lignin). The chemically-treated biomass 30 may be stored under anaerobic conditions for an amount of time (e.g., a short duration, a long duration) sufficient for the acid, base, or inorganic salt to diffuse throughout the preprocessed biomass 20 and solubilize the lignin products. The chemically-treated biomass 30 may be stored for weeks or for months under the anaerobic conditions. Since the chemical agent 25 is added before the preprocessed biomass 20 is stored, such as before the preprocessed biomass 20 is ensiled, the delignification of the chemically-treated biomass 30 may start during the storage rather than being conducted separately or at a later time.

Following the chemical addition and during the storage, the chemically-treated biomass 30 may be exposed to a heat treatment 40, forming chemically-treated biomass 30'. The heat treatment 40 may be conducted during one or more of the storage acts and at mild temperature conditions, such as between about 25° C. and about 125° C. or between about 70° C. and about 100° C. By exposing the chemically-treated biomass 30 to heat, the lignin products and other water-soluble components, such as carbohydrates, may be further solubilized. The heat treatment 40 may include exposing the chemically-treated biomass 30 to water at the above temperature conditions. By exposing the chemically-treated biomass 30 to steam, between about 35% and about 40% of the lignin products become solubilized in the water. The chemically-treated biomass 30' may be washed with additional water (e.g., hot water) to remove the lignin products and other water-soluble components in a liquid stream 45 while a fiber material 50 having a low moisture content (about 20% to about 40% moisture) is also produced following a disintegration act 55 (e.g., a mechanical disintegration act).

The disintegration act 55 may be used to fractionate the chemically-treated biomass 30' into a solid portion (e.g., the fiber material 50) and the liquid stream 45. The fiber material 50 may include the high molecular weight lignin 60. The low molecular weight lignin 65 and other water-soluble components of the biomass 5 may be recovered from the liquid stream 45 by water removal act 52 (e.g., filtration, such as membrane filtration, microfiltration, nanofiltration, or ultrafiltration, by evaporation, by precipitation, or other technique). A portion of the water in the liquid stream 45 may be removed (e.g., evaporated, concentrated) to produce the syrup 10 that contains the low molecular weight lignin 65. Water may also be removed from the fiber material 50, followed by densification 62 to form the pellets 15, which contain carbohydrate-rich products in addition to the high molecular weight lignin 60. The pellets 15 may be formed without conducting a pretreatment act, such as that conducted during conventional bioconversion of lignocellulose to biofuel. The moisture content of the pellets 15 may be about 10%.

If one pound (dry basis) of the preprocessed biomass 20 is used, about 0.35 pound (dry basis) of the syrup 10 may be recovered, along with about 0.65 pound (dry basis) of the pellets 15. By incorporating the chemical addition and the heat treatment into the storage of the biomass 5, the complexity and energy intensive acts of the process are simplified. While not illustrated, the water obtained following the disintegration and the densification acts may be converted to steam and re-used in the heat treatment 40, in a washing act (not shown), or as water utilized during other process acts. The chemical agent 25 (the acid, base, or inorganic salt) may also be recovered from the liquid stream 45 and reused in subsequent process acts.

Figure 7:
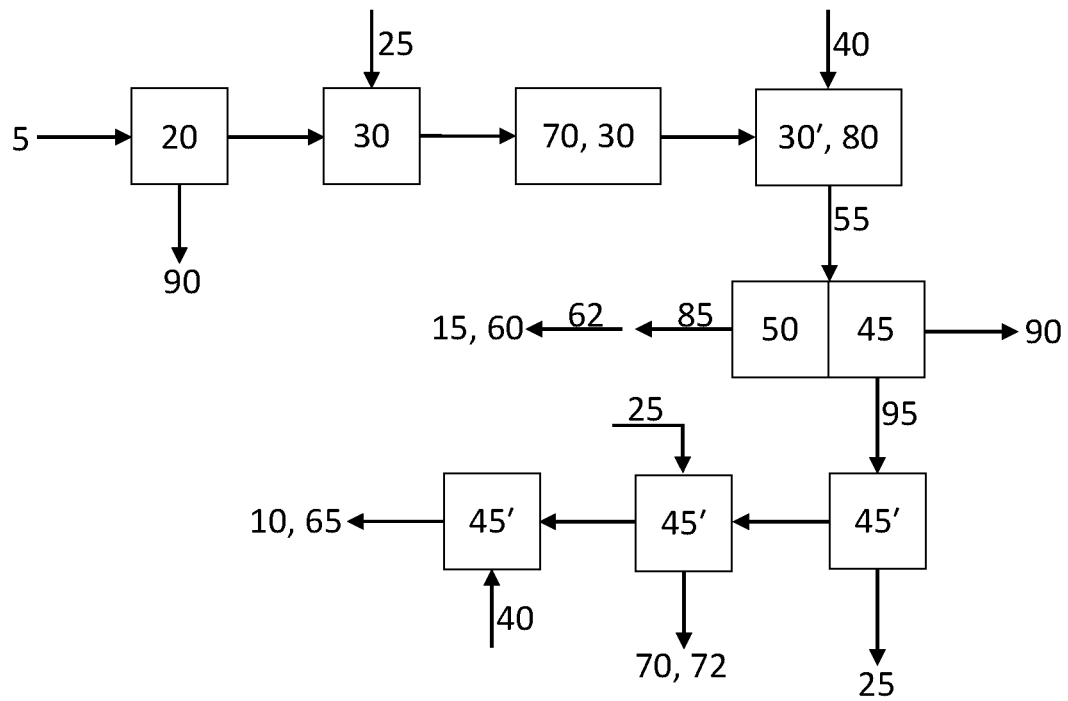

As shown in FIG. 7, a powder 72 containing the medium molecular weight lignin 70, a syrup 10 containing the low molecular weight lignin 65, and pellets 15 containing the high molecular weight lignin 60 may be produced from the biomass 5 according to embodiments of the disclosure. Bales of the biomass 5 are subjected to one or more preprocessing acts to remove small and large materials from the biomass 5. The small and large materials removed from the biomass 5 may include one or more of fines and contaminants, such as dirt, rocks, gravel, sand, metal, or other coarse contaminants. Preprocessing of the biomass 5 may separate (e.g., substantially remove) desired portions of the biomass based on size, producing the preprocessed biomass 20. In some embodiments, the biomass 5 is subjected to a vibrational screening act in which the fines and the contaminants are separated from a remaining portion of the biomass (e.g., the preprocessed biomass 20). The size reduction act may be conducted in a vessel including a vibrational screen that is configured to remove the fines and the contaminants from the biomass 5. The fines and the contaminants may be separately recovered or may be recovered as a combined feedstream (e.g., in a single feedstream).

The preprocessed biomass 20 may be added to a vessel, which may be the same as or different than the vessel in which the preprocessing acts are conducted. The chemical agent 25 is added to the preprocessed biomass 20 as described above with regard to FIG. 6. The chemical agent 25 may be a new solution containing the chemical agent 25 or may be chemical agent 25 recovered and reused from previously-conducted processes. The resulting chemically-treated biomass 30 is stored as described above with regard to FIG. 6. The chemically-treated biomass 30 may be stored for a long duration, such as from weeks to months, in long term storage 75 to preserve the chemically-treated biomass 30. The chemically-treated biomass 30 may then be exposed to a heat treatment 40 (e.g., steam treatment) for a short duration, such as from hours to days, and stored in short term storage 80. The heat treatment 40 may be conducted on the chemically-treated biomass 30 during the short term storage 80. Disintegration 55 may be conducted on the chemically-treated biomass 30 following the heat treatment 40, producing the liquid stream 45 and the fiber material 50. The resulting solid (e.g., the fiber material 50) may be dried, such as by low temperature drying 85, followed by densification 62 to produce the pellets 15 containing the high molecular weight lignin 60 having about 10% moisture. The low temperature drying 85 may be conducted on the fiber material 50 to remove water, followed by the densification 62 to form the pellets 15 as described above.

The liquid stream 45 may be filtered to remove additional fines 90 and a membrane filtration 95 conducted on the filtered liquid stream 45'. The chemical agent 25 may be recovered from the filtered liquid stream 45' following the membrane filtration 95 and reused (e.g., recycled). For instance, the recovered chemical agent 25 may be recovered and stored for use in additional processes. The low molecular weight lignin 65 and other water-soluble products, as well as water-insoluble products, such as the medium molecular weight lignin 70, may be recovered from the filtered liquid stream 45'. By way of example only, an acid or a base may be added to the filtered liquid stream 45' to precipitate the water-insoluble lignin products, which may be recovered as powder 72. The powder 72 may include the medium molecular weight lignin 70. Additional water removal acts, such as evaporation techniques, may be conducted on the filtered liquid stream 45' to produce the syrup 10 containing the water-soluble products (e.g., the low molecular weight lignin 65). A portion of the filtered liquid stream 45' may be evaporated by exposing the filtered liquid stream 45' to steam (e.g., a heat treatment 40). The syrup 10 may include the low molecular weight lignin 65, such as monomeric-, dimeric-, and trimeric-lignin products, and carbohydrates.

Figure 8:
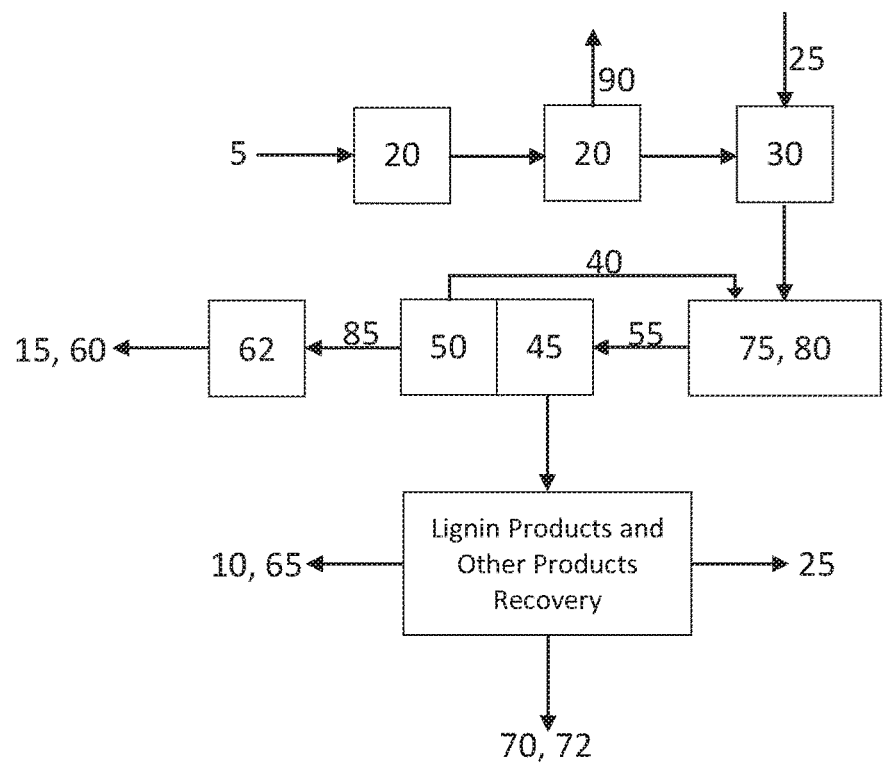

As shown in FIG. 8, a powder 72, a syrup 10 and pellets 15 are recovered from the biomass 5 according to other embodiments of the disclosure. The biomass 5 may be preprocessed as described above with regard to FIG. 7. The preprocessed biomass 20 (e.g., sized-reduced biomass) may be subjected to a separation act to remove the fines and contaminants 90. The chemical agent 25, such as an alkali, is added to the preprocessed biomass 20 and the resulting chemically-treated biomass 30 is stored, such as in long term storage 75 or short term storage 80, as described above with regard to FIGS. 6 and 7. Mechanical disintegration 55 and a heat treatment 40 are conducted on the chemically-treated biomass 30, as described above with regard to FIGS. 6 and 7. The resulting solid (e.g., the fiber material 50) may be dried, such as by low temperature drying 85, followed by densification 62 to produce the pellets 15 containing the high molecular weight lignin 60 and having about 20% moisture content. The low molecular weight lignin 65 and other water-soluble products are recovered from the liquid stream 45, producing the syrup 10 containing the low molecular weight lignin 65. The powder 72 containing the medium molecular weight lignin 70 is recovered from the liquid stream 45 by its different water solubility relative to the low molecular weight lignin 65 as described above with regard to FIG. 7. The alkali used as the chemical agent 25 may also be recovered from the liquid stream 45 and reused in subsequent process acts. The water from the mechanical disintegration 55 may be reused in other process acts.

Figure 9:
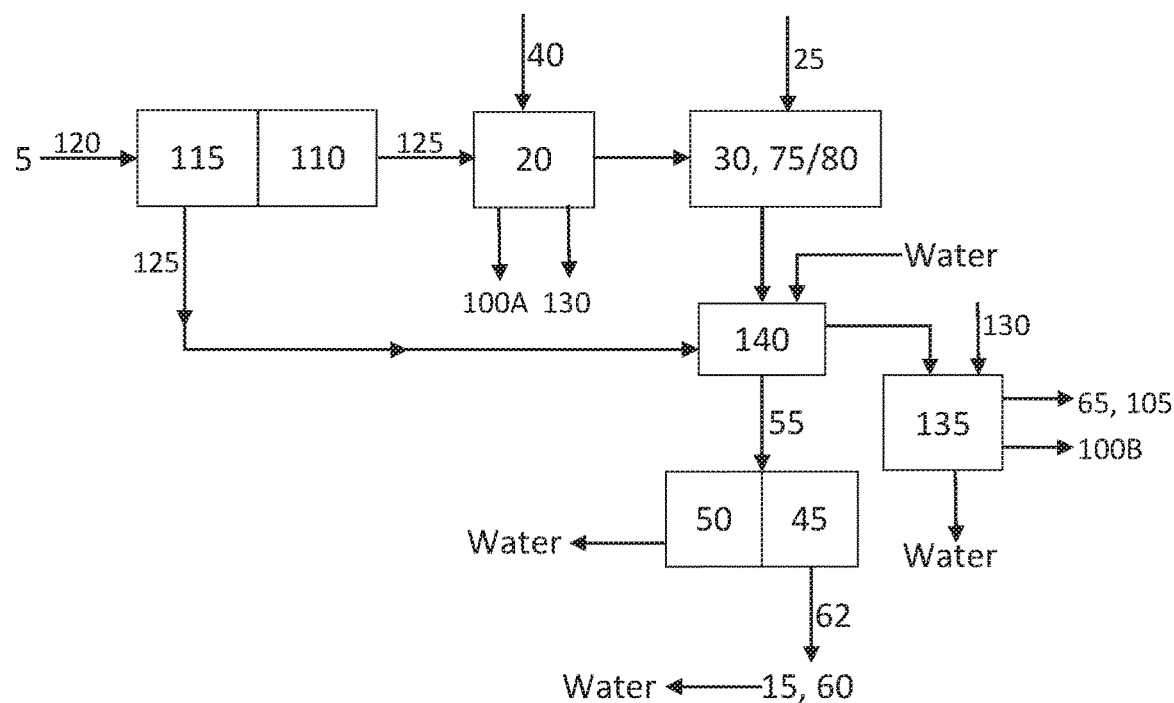

As shown in FIG. 9, one or more oils 100, a slurry 105, and pellets 15 are recovered from the biomass 5 according to embodiments of the disclosure. Water, the chemical agent 25, and other products may also be recovered and reused (e.g., recycled) in additional acts of the process. The biomass 5 is preprocessed by an air classification act 120 to produce a light biomass fraction 110 and a heavy biomass fraction 115, which are subjected to additional acts, as described below, to recover the products. The light biomass fraction 110 is subjected to a size reduction act 125 following the air classification act 120. The preprocessed biomass 20 from the light biomass fraction 110 is subjected to a heat treatment 40, such as a steam distillation, which extracts a first oil 100A (e.g., an essential oil) from the preprocessed biomass 20. The first oil 100A may be recovered from the light biomass fraction 110 following the steam distillation. The water (e.g., steam) used in the steam distillation may be generated as low-pressure steam from other process acts, such as during water removal acts or disintegration acts, which may be conducted during the recovery of the lignin products. A condensate 130 recovered following the steam distillation is subjected to a water treatment act 135 to recover the water. The preprocessed biomass 20 from the light biomass fraction 110 is exposed to the chemical agent 25. The chemical agent 25, such as a dilute acid, is added to the preprocessed biomass 20 and the resulting chemically-treated biomass 30 is stored, such as in long term storage 75 or short term storage 80. By way of example only, the dilute acid may include an aqueous solution of 0.045 pounds of sulfuric acid in 4.955 pounds water. The chemically-treated biomass 30 may optionally be deashed during storage 75, 80. Following storage 75, 80, the biomass 5 from the light biomass fraction 110 is subjected to a water washing act 140. Disintegration 55 (e.g., mechanical disintegration) is conducted on the chemically-treated biomass 30 from the light biomass fraction 110, producing the fiber material 50 and the liquid stream 45. The fiber material 50 is dried and densified to produce the pellets 15. The pellets 15 include high molecular weight lignin 60 and carbohydrates from the biomass 5 and exhibit about 5% moisture content. Water from the water removal and densification acts may be recovered in the water treatment act 135 and reused. The liquid stream 45 from the light biomass fraction 110 is subjected to the water treatment act 135 to recover the second oil 100B (e.g., another essential oil), the slurry 105 containing the low molecular weight lignin 65, and water.

The heavy biomass fraction 115 is subjected to a size reduction act 125 and the preprocessed biomass 20 from the heavy biomass fraction 115 may be subjected to an optional deash act and a disintegration act 55. The disintegration 55 (e.g., mechanical disintegration) of the preprocessed biomass 20 from the heavy biomass fraction 115 may be conducted together with the chemically-treated biomass 30 from the light biomass fraction 110, or the preprocessed biomass 20 from the heavy biomass fraction 115 may be separately subjected to mechanical disintegration.

By way of example only, about one-hundred pounds of biomass 5 is subjected to the air classification act 120 to produce the light biomass fraction 110 and the heavy biomass fraction 115. Each of the light biomass fraction 110 and the heavy biomass fraction 115 is then subjected to a separate size reduction act 125, producing about ten pounds of the dry matter as the light biomass fraction 110. After exposing the light biomass fraction 110 to steam (e.g., the heat treatment 40), about 0.06 pound of the first oil 100A is recovered. The remainder of the light biomass fraction 110 is subjected to the addition of the chemical agent 25 by adding about 0.045 pounds of sulfuric acid to 4.955 pounds of total water (i.e., water in biomass and water in acid). The chemically-treated biomass 30 is subjected to deashing and to the water washing act 140, followed by the disintegration 55 (e.g., mechanical disintegration) of the chemically-treated biomass 30 from the light biomass fraction 110. Water from the disintegration 55 may be recovered and reused, such as for the heat treatment 40. After removing water, the solid portion from the light biomass fraction 110 is removed, producing the fiber material 50 and the liquid stream 45. The fiber material 50 from the light biomass fraction 110 is dried and densified to produce about 101.94 pounds of pellets 15 having a 5% moisture content. The liquid stream 45 from the light biomass fraction 110 is subjected to the water treatment act 135, producing about 102.28 pounds of the slurry 105 and about 0.72 pound of the second oil 100B. About ninety pounds of the heavy biomass fraction 115 of the preprocessed biomass 20 may be combined with the chemically-treated biomass 30 from the light biomass fraction 110 and subjected to the disintegration 55. Water from the water treatment act 135 may be recovered and reused.

The methods according to embodiments of the disclosure integrate process acts to reduce cost and improve the operability relative to conventional methods. The low cost of the chemical agent and the ability to combine the chemical agent with the biomass during long-term storage enable the methods according to embodiments of the disclosure to be competitive with conventional methods. The methods also produce digestible, cellulose-rich feedstock for biofuel conversion, which will lead to higher product concentration and smaller unit operations resulting in lower required capital and operation costs. The carbohydrates may be highly digestible and may be converted to fuel and chemicals, used as animal feed as is, or blended with distiller dry grain to provide antimicrobial activity. In addition to producing the products described above, the methods according to embodiments of the disclosure achieve process intensification to lower the capital and operating cost of feedstock storage, preprocessing and pretreatment. The methods also reduce dry matter loss due to microbial degradation during storage. By way of example only, the dry matter loss during storage may be about 3% compared to a range of at least 6% to greater than 10% for conventional methods. Furthermore, since the pretreatment acts are conducted under mild conditions, the animal feed may be produced with anti-microbial properties. In addition, a highly digestible and low level of inhibitors substrate for biofuel production may be produced. The syrup contains the low molecular weight lignin and solubilized carbohydrate and also has anti-microbial properties. The lignin products may be a relatively pure lignin product that can be used as an anti-microbial agent or as a feedstock (e.g., chemical) for chemical production. One or more of the lignin products may, for example, be used as a feedstock to produce hydrocarbon fuels, nylon, bioplastic, replacement of phenol in phenol formaldehyde resin, or carbon black. Furthermore, the delignified fiber products are suitable for use as a feedstock in existing corn ethanol plants.

The following examples serve to explain embodiments of the disclosure in more detail. These examples are not to be construed as being exhaustive, exclusive, or otherwise limiting as to the scope of the disclosure. The following examples include general descriptions of processing options.

EXAMPLES

Example 1

A mixture of dilute sulfuric acid and $Fe_2(SO_4)_3$ are mixed with milled biomass to effect a chemically-impregnated biomass with a final moisture content of about 45 wt %, a pH of about 2.5, and a loading of about 0.05 wt % of $Fe_2(SO_4)_3$ with respect to dry biomass.

Example 2

A mixture of sodium carbonate ($Na_2CO_3$) and $FeSO_4$ are mixed with milled biomass to effect a chemically-impregnated biomass with a final moisture content of about 45 wt %, a pH of about 12, and a loading of about 0.1 wt % of $FeSO_4$ with respect to dry biomass.

Example 3

A solution of magnesium bisulfite ($H_2MgO_6S_2$) is mixed with milled biomass to effect a chemically-impregnated biomass with a final moisture content of about 45 wt % and a loading of about 2 wt % of magnesium bisulfite with respect to dry biomass.

Example 4

The chemically-impregnated biomasses of Examples 1-3 were stored. Bales were stored in stacks and the chopped biomass was stored in covered, compacted pile or in silos. The moisture of the chemically-treated biomass in storage ranged from about 30% to about 65%. Optionally, the stored, chemically-treated biomass materials were purged with carbon dioxide to minimize microbial degradation. The chemical addition served two purposes: (1) preserved the biomass from microbial degradation and therefore resulting in very low dry matter loss, (2) impregnated the biomass with the chemical agent during the long-term storage (weeks or months). Liquid runoff from the storage areas was collected, cleaned up (e.g., removing the biomass), and reused.

The biomasses were heated to between about 70° C. and about 130° C. for about 0.5 hour to about 24 hours. The heat treatment was conducted using direct steam injection in storage bunkers or silos. The pretreatment in silos was continuous with chemical-impregnated feedstock added to the top and heated, pretreated biomass conveyed out of the bottom of the silo. Steam was directly injected into the silo via multiple nozzles to evenly heat the biomass. Pretreated biomass was continuously discharged at the bottom of the silo.

The heat-treated biomass was deconstructed using a high compression and high shear dewatering device (e.g., high pressure roller press or screw press or extruder) to greatly increase the surface area of the biomass materials and obtain high cellulose enzyme digestibility. The mechanical deconstruction generated the liquid stream (pressate) and a disintegrated biomass solid with moisture content below about 30%. The liquid stream contained the medium molecular weight lignin and the low molecular weight lignin. The low moisture content fiber can be pelleted into the fiber material pellets containing the high molecular weight lignin without prior drying.

The dewatered fibers were densified into pellets and, as necessary, air dried to lower the moisture content to less than about 10% to stabilize the final product. The pellets may be used as a substrate for conversion to cellulosic sugars and fermentation products such as biofuels and biochemical, or as a ruminant animal feed supplement. This product had high cellulose digestibility and anti-microbial properties. The dewatered fibers (e.g., pellets) may also be blended with distillers dry grain in 5%-20% weight fraction of pretreated biomass of the mixture and pelleted. This pellet product had anti-microbial properties which may promote growth rate in animals.

The pressate was concentrated into the syrup containing the low molecular weight lignin using a reverse osmosis (RO) membrane and/or an evaporator. Evaporation also removed some of the volatile inhibitors such as acetic acid and furfural. The syrup exhibited anti-microbial properties and may be used as a feed supplement or fermentation substrate for biofuel and biochemical production.

The medium molecular weight lignin was recovered from the liquid stream by ultrafiltration, precipitation by acid addition flowed by heating, or filtration and was dried to form a powder.

Example 5

Corn stover bales were de-stringed then fluffed up using a bale processor to produce a mixture of uniform moisture and ash content. The loose corn stover was milled through a 2" screen using a high-shear size reduction shredder to reduce the particle size while minimizing the generation of fines. Fines and contaminants (e.g., gravel, sand, and metal) were removed separately from the milled biomass using an air density separator and vibrating screens. A dilute chemical solution (e.g., sodium hydroxide, sulfuric acid) was added to the milled and screened biomass to obtain about 40% to about 50% moisture content. The mixture was stored anaerobically for about a week to allow sufficient time for the chemical agent to diffuse throughout the fiber structure, then followed by low temperature treatment (using steam) to solubilize between about 35% and about 40% of the lignin.

The chemically-treated biomass was then processed using a pilot scale biomass disintegrator from Trinity Green Derivative Products (TGDP). The biomass material was washed with water to remove most of the soluble materials (lignin and carbohydrates). The biomass disintegrator achieved the following treatment in rapid sequence: size reduction, high-pressure dewatering, subcritical water treatment, and steam explosion. No external steam injection was needed as steam was generated in situ when the subcritical water saturated fibers exited the reactor. Pilot run data suggested that the total cost (capex and opex) of this treatment at commercial scale is less than $30/dry ton of biomass, which is significantly lower than conventional steam explosion pretreatment plus dewatering. The biomass disintegrator produced two main fractions: (1) a low moisture (about 20% wet basis), pretreated fiber material and (2) a liquid stream containing solubilized low molecular weight lignin, extractives, hemicellulose, and small amount of fiber fines.

The fiber fraction (about 20% moisture) was densified to produce a storable, uniform and highly digestible, conversion ready product. Lignin and a fraction of the added chemical agent was recovered from the liquid stream using membrane filtration. The recovered lignin can potentially be converted to jet fuel or used as a phenol substitute in phenol formaldehyde resin. A portion of the chemical agent was recovered and reused. The depleted lignin liquid stream can potentially be used as a nutrient supplement for plant growth. Optionally, the biomass fines can also be added to the depleted lignin liquid and used in hydro mulch. Overall, there is no wastewater treatment requirement, and only a small amount of solid contaminant requires disposal.

A biomass stillage cake was obtained from the solid-liquid separation of the stillage of the ethanol beer column. The cake may be pyrolyzed into biochar, which may be used to promote growth of plants.

Example 6

A low-cost delignification agent (an alkali such as magnesium hydroxide or calcium hydroxide or sodium hydroxide) was added during baling or chopping operations in the field or after grinding and before storage to achieve a pH of between about 9 and about 12. The moisture content of the alkali-treated biomass ranged from about 30% to about 50%. The DLA inhibited microbial activity and, therefore, minimized the degradation of biomass during long-term storage. It was expected that introducing the delignification agent in storage would reduce the dry matter losses that occur due to microbial activity to near zero. At ambient storage temperature, the delignification reaction was not expected to take place to any appreciable extent. When the biomass from storage was ready for use in the biorefinery, the chemically-impregnated biomass was conveyed to the preprocessing facility next to the biorefinery. In the preprocessing facility, the treated biomass was size reduced (as necessary), a delignification catalyst (e.g., oxygen, hydrogen peroxide) was optionally added to the biomass, and additional DLA agent was added if necessary to maintain a pH between about 9.5 and about 11.5. The mixture was then heated to from about 70° C. to about 100° C. using direct steam injection or other heat sources (e.g., microwave). Alternately, heated air was purged through the stored feedstock to provide the required oxygen and heat. The DLA and the catalyst began to de-lignify the biomass at elevated temperature. The residence time ranged from about 0.5 hour to about 24 hours depending on the extent of desired delignification and types of biomass. A portion of the lignin was dissolved in the liquid stream. Because lignin is associated with hemicellulose, it is expected that a small fraction of hemicellulose and extractives are also extracted. The use of magnesium hydroxide was reported to minimize degradation of carbohydrates. This mild treatment may be performed in storage silos or bunkers. The dissolved lignin was washed from the treated biomass with water in a counter-current washer to minimize dilution of the lignin stream. Lignin and water-soluble carbohydrates were separated from the fines and concentrated via micro- and ultra-filtration. The unreacted delignification agent and catalyst(s) were recycled and reused. The lignin and dissolved carbohydrates were separated in the lignin recovery step, which optionally included drying the lignin.

Example 7

A DLA was added to the biomass during the baling operation (using a similar method as adding bacteria inoculum to hay prior to ensiling) or to the chopped biomass during the single-pass harvest and chop operation. The delignification served two purposes: (1) preserve the biomass from microbial degradation and therefore resulting in very low dry matter, (2) impregnate the biomass with the DLA during the long-term storage (weeks or months). The bales were stored in stacks or the chopped biomass was stored in a compacted pile and a tarp placed over the bales or piles of chopped biomass to minimize washing the delignification agent from the bales or piles. Liquid runoff from the storage areas was collected, cleaned up (e.g., removing the biomass) and reused. The DLA included an alkali solution or slurry (e.g., sodium hydroxide, potassium hydroxide, calcium hydroxide, or magnesium hydroxide). The loading of the DLA (dry weight basis) ranged from about 0.1% to about 5% of the dry weight of biomass material. The moisture of the resulting mixture (biomass+DLA+water in the original biomass and water in the DLA solution/slurry) ranged from about 30% to about 50%.

The DLA-impregnated biomass from long-term storage was transported or conveyed to a day storage facility (e.g., short term storage) where catalysts were added and the mixture heated to accelerate the delignification process. The catalysts included one or more of the following compounds: anthraquinone (which hinders the solubilization of carbohydrate by alkali), oxygen, hydrogen peroxide, or EDTA. The mixture was stored in silos or bunkers. Direct injection of steam into the mixture maintained the temperature at about 70° C. to about 100° C. The retention time of the heated mixture was about 0.5 hour to about 24 hours depending on the loading of the DLA, catalyst(s) and treatment temperature. The delignified biomass was passed through a washing device and a solid/liquid separation device where lignin solution was recovered from the insoluble biomass, and DLA slurry (e.g., calcium hydroxide or magnesium hydroxide) was recovered separately and reused in the impregnation step or in the pile storage.

The washed and delignified biomass was passed through mechanical size reduction treatment (disc refiner, high-pressure roller press) to macerate the fiber structure for improving the enzyme digestibility. A concentrated lignin solution/slurry product was recovered from the extract solution via microfiltration and ultrafiltration. A carbohydrate containing solution was concentrated using a RO membrane.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of recovering lignin products and other products from biomass, the method comprising:
    adding a chemical agent to a biomass comprising lignin and exhibiting a pH of from about 11.0 to about 13.0 to form a chemically-treated biomass, the chemical agent comprising an acid, a base, an inorganic salt, or a combination of the inorganic salt and one of the acid or the base;
    storing the chemically-treated biomass under anaerobic conditions; and
    recovering one or more of high molecular weight lignin, medium molecular weight lignin, or low molecular weight lignin from the chemically-treated biomass, the high molecular weight lignin comprising greater than or equal to about fifty degrees of polymerization (DP), the medium molecular weight lignin comprising greater than or equal to about ten DP and less than about forty-five DP, and the low molecular weight lignin comprising from about one DP to about three DP.

2. The method of claim 1, wherein adding a chemical agent to a biomass comprising lignin comprises adding one or more of sulfuric acid, formic acid, or acetic acid to the biomass.

3. The method of claim 1, wherein adding a chemical agent to a biomass comprising lignin comprises adding one or more of sodium hydroxide, calcium hydroxide, or magnesium hydroxide to the biomass.

4. The method of claim 1, wherein adding a chemical agent to a biomass comprising lignin comprises adding one or more of sodium carbonate, magnesium bisulfite, sodium bisulfite, calcium chloride ($CaCl_2$)), magnesium chloride ($MgCl_2$), iron(II) chloride ($FeCl_2$), iron(II) sulfate ($FeSO_4$), iron(III) chloride ($FeCl_3$), or iron(III) sulfate ($Fe_2(SO_4)_3$) to the biomass.

5. The method of claim 1, wherein storing the chemically-treated biomass under anaerobic conditions comprises introducing carbon dioxide to the chemically-treated biomass.

6. The method of claim 1, wherein recovering one or more of low molecular weight lignin products, medium molecular weight lignin products, or high molecular weight lignin products from the chemically-treated biomass comprises recovering the lignin products as one or more of an oil, a slurry, a syrup, or pellets.

7. The method of claim 1, further comprising conducting a heat treatment on the chemically-treated biomass.

8. The method of claim 7, wherein conducting a heat treatment on the chemically-treated biomass comprises exposing the chemically-treated biomass to steam or other heat source.

9. The method of claim 8, wherein adding a chemical agent and exposing the chemically-treated biomass to steam or other heat source are conducted substantially simultaneously.

10. A method of recovering lignin products and other products from biomass, the method comprising:
    storing a chemically-treated biomass at a moisture content of between about 30% and about 50% and under anaerobic conditions, the chemically-treated biomass exhibiting a pH of from about 2.0 to about 4.0 and comprising lignin and an acid, a base, an inorganic salt, or a combination of the inorganic salt and one of the acid or the base;
    heating the chemically-treated biomass during storage; and
    recovering lignin products.

11. The method of claim 10, further comprising introducing a biomass exhibiting a pH of from about 11.0 to about 13.0 to storage before storing the chemically-treated biomass under anaerobic conditions.

12. The method of claim 10, wherein the inorganic salt comprises one or more of sodium carbonate, magnesium bisulfite, sodium bisulfite, calcium chloride ($CaCl_2$)), magnesium chloride ($MgCl_2$), iron(II) chloride ($FeCl_2$), iron(II) sulfate ($FeSO_4$), iron(III) chloride ($FeCl_3$), or iron(III) sulfate ($Fe_2(SO_4)_3$).

13. The method of claim 10, wherein recovering lignin products comprises recovering low molecular weight lignin products.

14. The method of claim 13, wherein recovering low molecular weight lignin products comprises recovering the low molecular weight lignin products as a syrup.

15. The method of claim 10, wherein recovering lignin products comprises recovering medium molecular weight lignin products.

16. The method of claim 15, wherein recovering medium molecular weight lignin products comprises recovering the medium molecular weight lignin products as a powder.

17. The method of claim 10, wherein recovering lignin products comprises recovering high molecular weight lignin products.

18. The method of claim 17, wherein recovering high molecular weight lignin products comprises forming the high molecular weight lignin products into pellets.

* * * * *

UNITED STATES PATENT AND TRADEMARK OFFICE
CERTIFICATE OF CORRECTION

| | | |
|---|---|---|
| PATENT NO. | : 11,420,992 B2 | Page 1 of 1 |
| APPLICATION NO. | : 16/947054 | |
| DATED | : August 23, 2022 | |
| INVENTOR(S) | : Quang A. Nguyen and Lynn M. Wendt | |

It is certified that error appears in the above-identified patent and that said Letters Patent is hereby corrected as shown below:

In the Specification

| | | |
|---|---|---|
| Column 3, | Lines 62,63 | change "3-methoxyphenyipropane" to --3-methoxyphenylpropane-- |
| Column 3, | Line 63, | change "4-hydroxyphenyipropane" to --4-hydroxyphenylpropane-- |

In the Claims

| | | | |
|---|---|---|---|
| Claim 4, | Column 21, | Line 47, | change "chloride ($CaCl_2$))," to --chloride ($CaCl_2$),-- |
| Claim 12, | Column 22, | Line 33, | change "chloride ($CaCl_2$))," to --chloride ($CaCl_2$),-- |

Signed and Sealed this
Fourth Day of July, 2023

Katherine Kelly Vidal
*Director of the United States Patent and Trademark Office*